(12) United States Patent
Kata (10) Patent No.: US 7,648,668 B2
(45) Date of Patent: Jan. 19, 2010

(54) APPARATUS FOR MANUFACTURING PNEUMATIC TIRES

(75) Inventor: Takehiro Kata, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 648 days.

(21) Appl. No.: 10/513,000

(22) PCT Filed: Apr. 30, 2003

(86) PCT No.: PCT/JP03/05549

§ 371 (c)(1), (2), (4) Date: May 17, 2005

(87) PCT Pub. No.: WO03/092989

PCT Pub. Date: Nov. 13, 2003

(65) Prior Publication Data

US 2005/0226951 A1  Oct. 13, 2005

(30) Foreign Application Priority Data

Apr. 30, 2002 (JP) ............................. 2002-127936

(51) Int. Cl.
*B29C 35/02* (2006.01)
(52) U.S. Cl. ............................ 264/326; 425/35; 425/36
(58) Field of Classification Search ................... 425/35, 425/36, 49, 54, 55, 56, 57; 264/326
See application file for complete search history.

(56) References Cited

U.S. PATENT DOCUMENTS 4,181,488 A * 1/1980 Grawey et al. ................. 425/49
5,851,557 A * 12/1998 Pouille et al. ................. 425/35
6,113,833 A * 9/2000 Ogawa ........................ 264/326
6,479,008 B1 * 11/2002 Caretta ........................ 425/49

FOREIGN PATENT DOCUMENTS

| JP | A-62-270308 | | 11/1987 |
| JP | A-11-034062 | | 2/1999 |
| JP | A-11-115420 | | 4/1999 |
| JP | 2000052347 A | * | 2/2000 |
| JP | A-2000-052347 | | 2/2000 |
| JP | A-2001-088143 | | 4/2001 |

* cited by examiner

*Primary Examiner*—James Mackey
(74) *Attorney, Agent, or Firm*—Oliff & Berridge, PLC (57) ABSTRACT

An apparatus for manufacturing a pneumatic tire including a rigid core for forming a green tire on an outer face and a vulcanizing mold which can transport the green tire together with the rigid core such that the vulcanizing mold is closed to form a vulcanization space for sealing and storing the green tire between the vulcanizing mold and the rigid core so that the green tire is vulcanized in the vulcanization space, an annular movable seal supported by either one of the vulcanizing mold or the rigid core, and an urging means for urging the movable seal from the one of the vulcanizing mold and the rigid core that supports the annular movable seal toward a surface of the other of the vulcanizing mold and the rigid core, the movable seal being urged by the urging means toward the surface of the other of the vulcanizing mold and the rigid core so as to prevent generation of a gap between the vulcanizing mold and the rigid core when the vulcanizing mold is closed, and to absorb a change in shape of the rigid core upon vulcanization of the green tire.

8 Claims, 6 Drawing Sheets

APPARATUS FOR MANUFACTURING PNEUMATIC TIRES

BACKGROUND ART

1. Field of the Invention

The present invention relates to a method and an apparatus for manufacturing a pneumatic tire using a rigid core in the toroidal shape.

2. Prior Art

There is known a method for manufacturing a pneumatic tire by forming a green tire through sequential application of tire constituting members such as unvulcanized rubber ribbon, wire, cord, etc. on a rigid core having an outer surface corresponding to an inner surface of a product tire, as disclosed, for example, in the JP 11-115420 A2. In this case, by transporting the green tire with the rigid core into a vulcanizing mold and closing the vulcanizing mold so as to form a vulcanization space where the green tire is sealed and stored between it and the rigid core, and then by supplying a vulcanizing medium into the vulcanizing mold and the rigid core so as to vulcanize the green tire so that a pneumatic tire is produced.

When a pneumatic tire is to be produced using such a rigid core, there are cases where the rigid core is subjected to an excessive gripping force from the vulcanizing mold and broken upon vulcanization. That is, when the green tire is transported into the vulcanizing mold together with the rigid core, the temperature of the rigid core is a normal temperature, about 20° C., for example, or if it has been pre-heated, the temperature is about 100°, while the temperature of the vulcanizing mold is held at a temperature somewhat lower than 170° C., which is the vulcanization temperature, because its heat capacity is large. After the vulcanizing mold is brought into contact with the inner end of the rigid core by closing the vulcanizing mold in this state, if the vulcanizing medium is supplied into the vulcanizing mold and the rigid core, the rigid core has its temperature rise from the temperature at transportation to a vulcanizing temperature by about 150° C. or 70° C. and is subjected to large thermal expansion. But the vulcanizing mold has its temperature hardly rise and is not substantially expanded thermally, and moreover, its movement is strongly regulated by a large clamping force, which exerts an excessive gripping force to a contact portion of rigid core with the vulcanizing mold and might break the rigid core.

In order to avoid occurrence of the above mentioned excessive gripping force, a gap somewhat narrower than the thermal expansion of the rigid core may be provided between the inner end of the rigid core and the vulcanizing mold when the vulcanizing mold is closed. However, in this case, during the period till the gap is lost due to thermal expansion of the rigid core, the green rubber might protrude out of the gap and generate a burr.

And such problem is more remarkable when the thermal expansion rate (linear expansion rate) of the rigid core is larger than that of the vulcanizing mold, for example, when the vulcanizing mold is made of steel, while the rigid core is formed by an aluminum alloy or the like.

DISCLOSURE OF THE INVENTION

It is an object of the present invention to provide a method and an apparatus for manufacturing a pneumatic tire which can effectively prevent such a state that an unvulcanized rubber protrudes out of a gap between a rigid core and a vulcanizing mold at vulcanization to generate a burr or that the rigid core is subjected to an excessive gripping force from the vulcanizing mold and broken.

Therefore, according to the present invention, there is provided a method for manufacturing a pneumatic tire in which a green tire is formed on an outer surface of a rigid core, the green tire is transported into a vulcanizing mold together with a rigid core, and the vulcanizing mold is closed to form a vulcanization space for sealing and storing the green tire between the vulcanizing mold and the rigid core so that the green tire is vulcanized in the vulcanization space, wherein an annular movable seal supported by either one of the vulcanizing mold and the rigid core is urged toward the surface of the other so as to prevent generation of a gap between the vulcanizing mold and the rigid core when the vulcanizing mold is closed and to absorb change in the shape of the rigid core at vulcanization.

Also, according to the present invention, there is provided an apparatus for manufacturing a pneumatic tire provided with a rigid core for forming a green tire on the outer surface and a vulcanizing mold which can transport the green tire together with the rigid core, in which the vulcanizing mold is closed to form a vulcanization space to seal and store the green tire between the vulcanizing mold and the rigid core and the green tire within the vulcanization space is vulcanized, wherein an annular movable seal supported by either one of the vulcanizing mold and the rigid core is provided, and the movable seal is urged toward the surface of the other of the vulcanizing mold and the rigid core so as to prevent generation of a gap between the vulcanizing mold and the rigid core when the vulcanizing mold is closed and to absorb change in the shape of the rigid core at vulcanization.

According to the present invention, when the vulcanizing mold is closed, the annular movable seal supported by either one of the vulcanizing mold and the rigid core is urged toward the surface of the other to prevent generation of a gap between the vulcanizing mold and the rigid core at closure of the vulcanizing mold so that the unvulcanized rubber does not protrude out of the gap between the vulcanizing mold and the rigid core at vulcanization and therefore, generation of a burr can be surely prevented. When vulcanizing a green tire by supplying a vulcanizing medium into the vulcanizing mold and the rigid core, the temperature of the rigid core, which has been at a normal temperature or a pre-heated temperature, rises to the vulcanization temperature and the rigid core is thereby thermally expanded. However, since the annular movable seal supported by the vulcanizing mold or the rigid core absorbs change in the shape of the rigid core at vulcanization, gripping force acting on the rigid core rarely changes and as a result, breakage of the rigid core can be prevented. And this function is surely exerted even if there is a large difference in the thermal expansion rate between the rigid core and the vulcanizing mold.

It is preferred that either one of the above vulcanizing mold and the rigid core has an annular recess portion for storing the movable seal and is further provided with an urging means arranged in the annular recess portion for pressing the movable seal toward the surface of the other of the vulcanizing mold and the rigid core.

It is preferred that the annular recess portion is provided at the rigid core, and by aligning the outer surface of the movable seal before closure of the vulcanizing mold with the surface of the rigid core adjacent to both sides of said annular recess portion, a step displacement on the inner surface of the green tire based on the step generated at the border between the movable seal and the rigid core can be prevented.

In this case, it is preferred that the inner surface portion of the vulcanizing mold to which the outer surface of the movable seal is brought into an elastic contact is formed as a projecting portion with the width narrower than said annular recess portion.

It is preferred that the urging means is a compression spring made of metal. In this case, it can apply an urging force to the movable seal surely for a long time at a high temperature.

It is preferred that the urging means bring the movable seal into an elastic contact with the surface of the other of the above vulcanizing mold and the rigid core at a contact pressure of 1 to 3 MPa. In this case, a fear of protrusion of the green tire or deformation of the vulcanizing mold or the rigid core can be eliminated.

It is preferred that the movable seal is constituted to be supported by the rigid core at a position adjacent to the bead tip end position of the green tire or supported by the vulcanizing mold at a position adjacent to the bead bottom position of the green tire.

BEST MODE FOR CARRYING-OUT THE INVENTION

A first preferred embodiment of the present invention will be hereinafter described referring to FIGS. 1 through 4.

Figure 1:
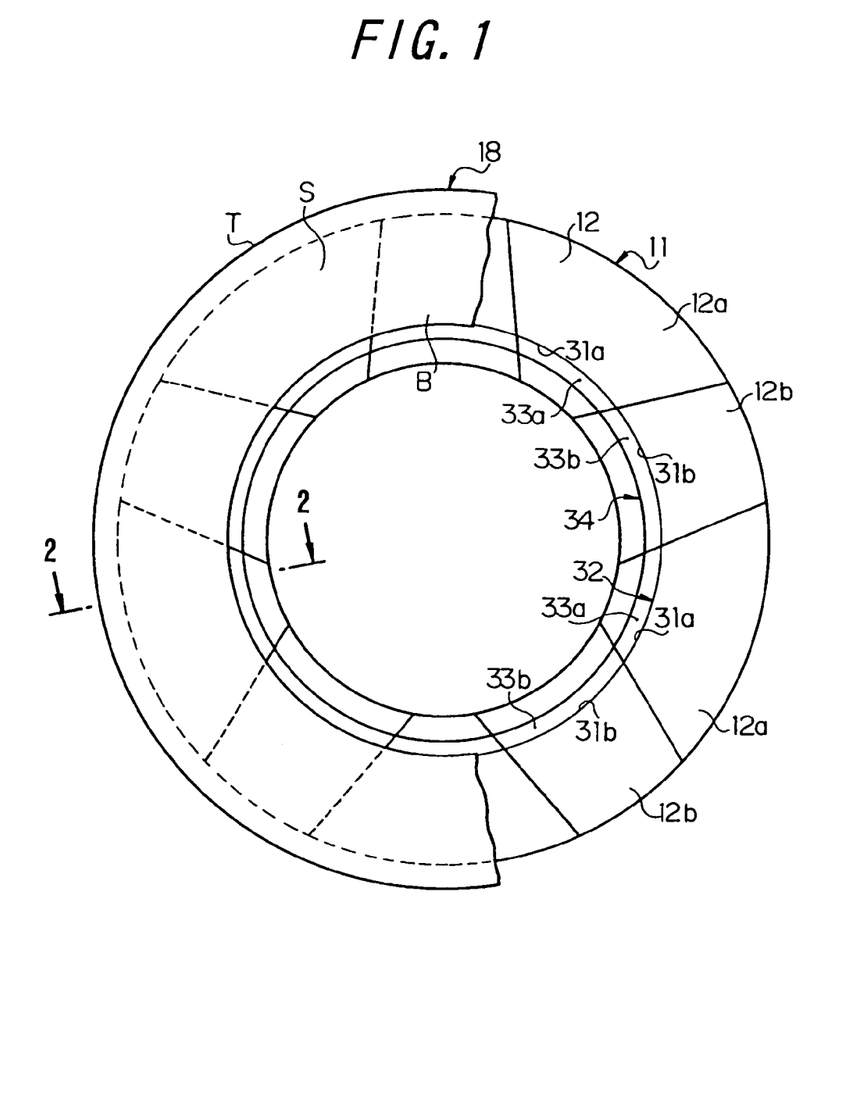
FIG. 1 is a partially broken plan view showing a rigid core according to a first preferred embodiment of the present invention in the state where a green tire is formed.
Figure 2:
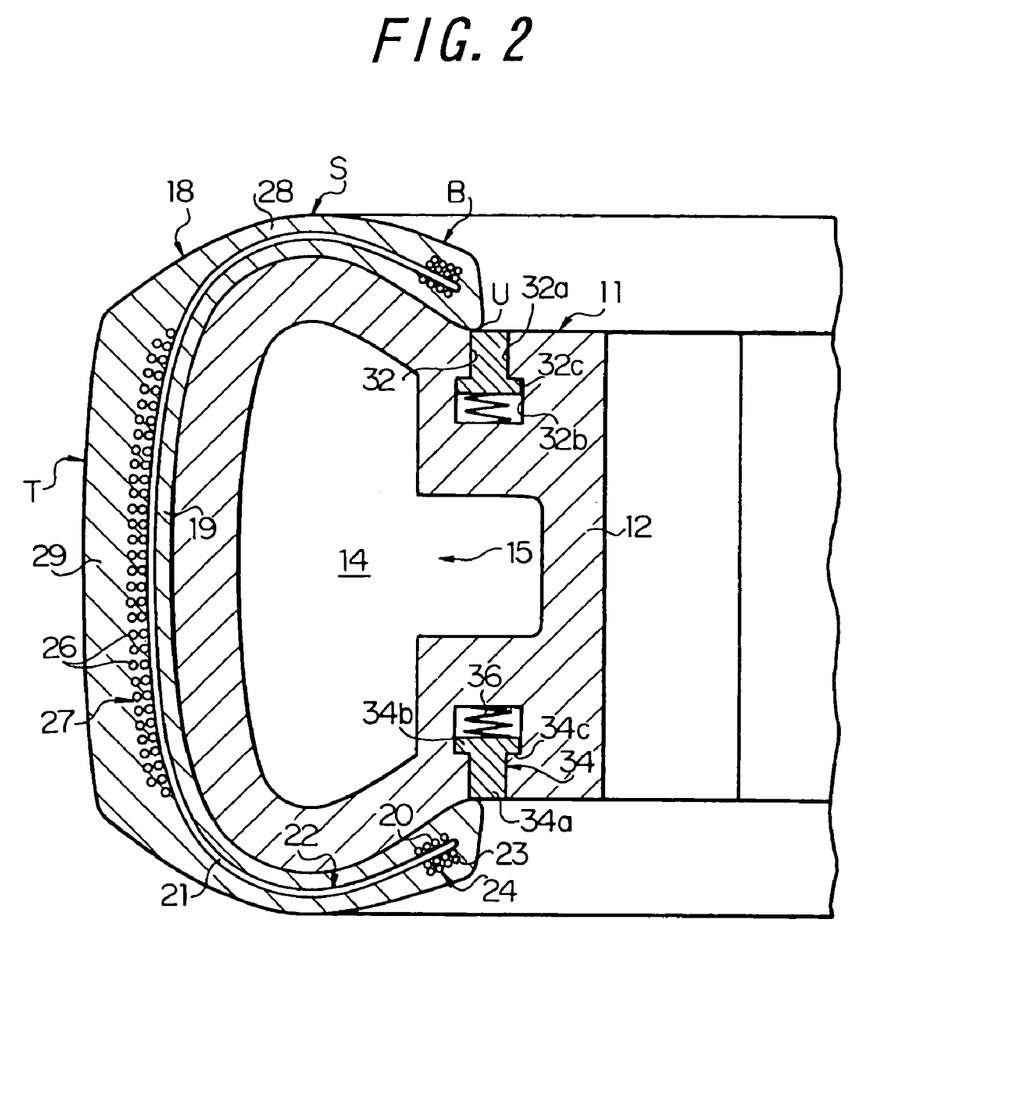
FIG. 2 is a sectional view seen from an arrow of 2-2 in FIG. 1.

In FIGS. 1 and 2, reference numeral 11 represents a rigid core made of metal generally presenting a toroidal shape. The rigid core 11 has an outer surface on the outer side in the radial direction in the same shape as the inner surface of a vulcanized pneumatic tire (product tire). The rigid core 11 is assembled by closely aligning a plurality of arcuate core segments 12 in the circumferential direction. The core segment 12 is comprised of two types of segments: a sectored segment 12a whose planar shape is a sector and an angular segment 12b in almost the ridge shape, and they are arranged alternately in the circumferential direction.

Inside each of the core segments 12, a penetration chamber 14 extending in the circumferential direction is formed, and these penetration chambers 14 are opened at both ends in the circumferential direction of the core segment 12. Here, when the core segment 12 is assembled in the close state in the circumferential direction as mentioned above, all the penetration chambers 14 penetrate in the ring state so as to constitute a vulcanizing medium chamber 15 in the consecutive ring state for supplying a vulcanizing medium into the rigid core 11.

Reference numeral 18 represents a green tire mounted to the outside of the rigid core 11. The green tire 18 is formed on the outside of the rigid core 11 by applying, for example, tire constituting members such as unvulcanized rubber ribbon, wire, cord, etc. to the rigid core 11 in order as below. That is, first, the unvulcanized rubber ribbon is applied to the outside of the rigid core 11 in the spiral state by a large number of times so as to form an inner liner 19 and then, a bead wire 20 is wound on the outside of the inner liner 19 in a bead portion B in the spiral state by a plurality of times.

Next, on the outside of the inner liner 19, a carcass cord 21 is applied in the meridian direction while folding it at both bead portions B while displacing the application in the circumferential direction by a large number of times to form a carcass layer 22. After that, on the outside of the carcass layer 22 in the bead portion B, a bead wire 23 is wound in the spiral state by a plurality of times to form a bead core 24 holding the carcass layer 22 with said bead wire 20 between them.

Next, on the outside in the radial direction of the carcass layer 22, a belt cord 26 is applied helically by a large number of times to form a belt layer 27, and then, an unvulcanized rubber ribbon is applied to the outside of the carcass layer 22 in a sidewall portion S in the spiral state by a large number of times to form a side tread 28 and by applying the unvulcanized rubber ribbon to the outside of the belt layer 27 helically by a large number of times to form a top tread 29 so that a green tire 18 is formed.

Here, on both upper and lower faces of the sectored segment 12a and the angular segment 12b in the neighborhood of a bead toe U of the above mentioned green tire 18, arcuate recesses 31a and 31b are formed extending in the circumferential direction, respectively, with the same radium of curvature. If the sectored segment 12a and the angular segment 12b are assembled in the close state in the circumferential direction as mentioned above, said arcuate recesses 31a and 31b continue and form a pair of annular recesses 32 extending, respectively, along the bead toe U on the upper face and the lower face of the rigid core 11 in the neighborhood of both the bead toes U of the green tire 18.

These annular recesses 32 are comprised of a narrow width portion 32a located on the face side and a wide width portion 32b which is wider than the narrow width portion 32a located on the inner side and have the T-shaped cross section. And at the border between the narrow width portion 32a and the wide width portion 32b of each of the annular recesses 32, a stepped surface 32c which is parallel with the upper and the lower faces of the rigid core 11 and functions as a stopper is formed.

In said arcuate recesses 31a and 31b, arcuate pieces 33a and 33b with the length equal to these arcuate recesses 31a and 31b, respectively, are inserted movably in the depth direction. These arcuate pieces 33a and 33b continuously constitute an annular movable seal 34 when the sectored segment 12a and the angled segment 12b are assembled in the close state in the circumferential direction. As a result, into each of the annular recesses 32, the annular movable seal 34 is movably inserted in the depth direction of the annular recess 32.

And these movable seals 34 are also constituted as with the annular recess 32 by a narrow width portion 34a located on the face side and having the width equal to the narrow width portion 32a and a wide width portion 34b located on the inner side and having the width equal to the wide width portion 32b and presents the T-shaped cross section. And at the border between the narrow width portion 34a and the wide width portion 34b of each of the movable seals 34, a stepped surface 34c which can be brought into contact with the stepped surface 32c of the annular recess 32 is formed.

Between the bottom faces of the arcuate pieces 33a, 33b and the arcuate recesses 31a, 31b, compression coil springs 36 made by metal are interposed, respectively. As a result, the metal compression coil spring 36 for urging the movable seal 34 to project from the annular recess 32 (that is, toward an upper mold and a lower mold, which will be described later) is stored in each of the annular recesses 32. When the metal compression coil spring 36 is used as an urging means in this way, an urging force can be surely applied to the movable seal 34 even if used for a long time at a high temperature for vulcanization, which will be described later.

And when the urging force is received from the coil spring 36 as mentioned above, each of the movable seals 34 is moved to the projecting side, but the movement is restrained by contact of the stepped surface 34c into the stepped surface 32c of the annular recess 32 and stopped at the position concerned. At this time, the outer surface of each of the movable seal 34 is located on the extension of the upper and the lower faces of the rigid core 11 located on both sides of the annular recess 32 to which the movable seal 34 is inserted, and as a result, the outer surface of the movable seal 34 is made flush with the upper and the lower faces of the rigid core 11, and there exists no step at the border of them.

When the outer surface of the movable seal 34 is located on the extension of the upper and the lower faces of the rigid core 11 located on both sides of the annular recess 32 before the closure of the vulcanizing mold when no external force is applied to the movable seal 34, stepped displacement on the inner face of the green tire 18 based on the step generated at the border between the movable seal 34 and the rigid core 11 can be prevented.

Figure 3:
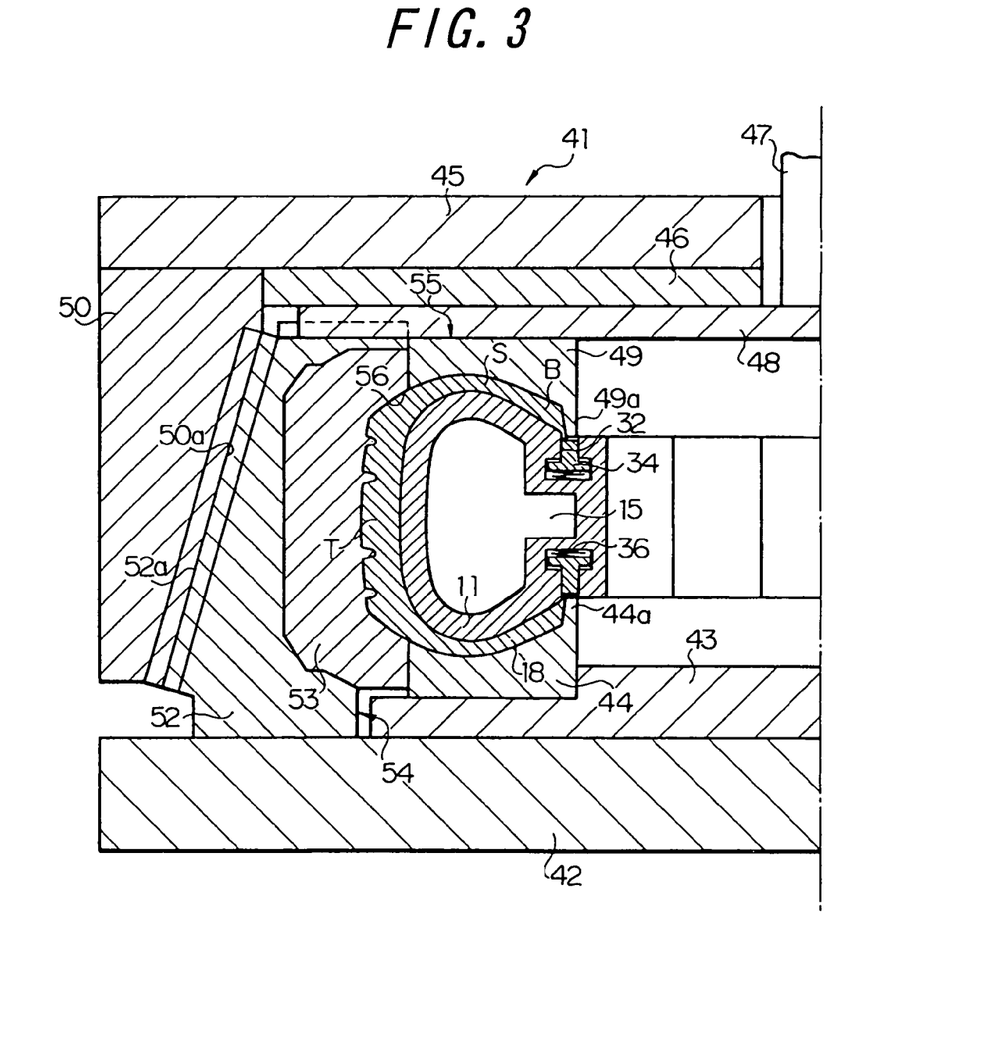
FIG. 3 is a front sectional view of a vulcanizing apparatus which stores a green tire together with a rigid core.
Figure 4:
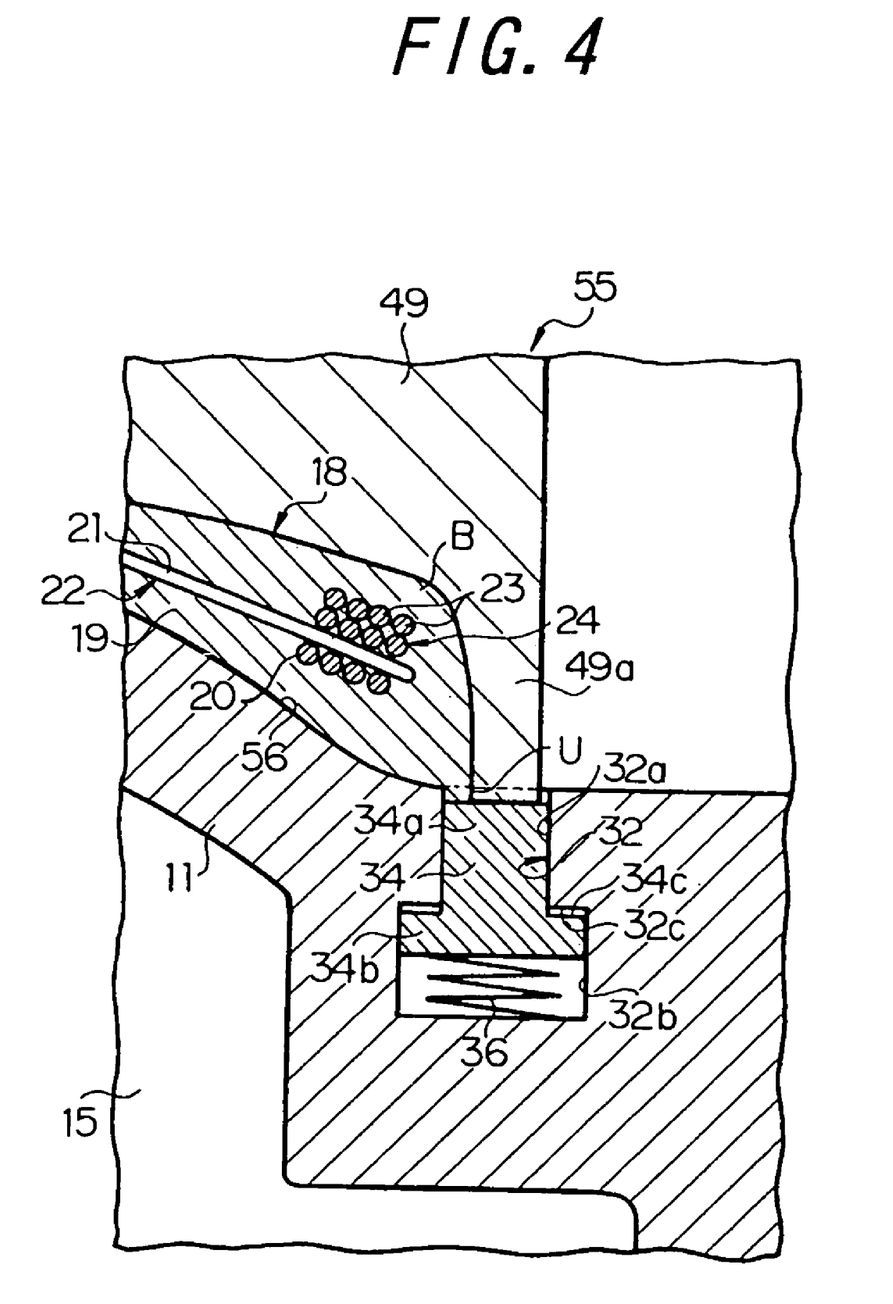
FIG. 4 is a front sectional view of the neighborhood of a bead portion at vulcanization.

When the green tire 18 is formed on the outside of the rigid core 11 as mentioned above, the green tire 18 is transported together with the rigid core 11 by a conveying device (not shown) to a vulcanizing device 41 for vulcanization. Here, the above mentioned vulcanizing device 41 has, as shown in FIGS. 3 and 4, a lower base 42, and on this lower base 42, a lower platen 43 into which a high-temperature and high-pressure vulcanizing medium is supplied at vulcanization is fixed, wherein on this lower platen 43, a lower mold 44 for molding a lower sidewall portion S and a lower bead portion B of the green tire 18 is mounted.

A reference numeral 45 represents an upper base placed above the lower base 42 and having an upper platen 46 fixed to its lower face as with the lower platen 43. The upper base 45 is elevated up and down by a cylinder (not shown) to approach to/separate from the lower base 42. Immediately under the upper base 45, an upper plate 48 connected to the tip end of a piston rod 47 in the cylinder is placed, and this upper plate 48 can be elevated by operation of the cylinder separately from the upper base 45.

A reference numeral 49 represents an upper mold fixed to the lower face of the upper plate 48 and elevated up and down with the upper plate 48 to approach to/separate from the lower mold 44. The upper mold 49 molds an upper sidewall portion S and an upper bead portion B of the green tire 18 at vulcanization. A reference numeral 50 represents an outer ring placed surrounding the upper plate 48 from outside in the radial direction. The upper end of the outer ring 50 is fixed to the outer end in the radial direction of the upper base 45. And an inner circumference 50a of the outer ring 50 is an inclined face expanded downward (part of a conical face).

Reference numeral 52 represents a plurality of sector segments aligned in the circumferential direction. The sector segment 52 is supported movably in the radial direction by its upper end by the upper plate 48 outside in the radial direction from the upper mold 49, and the vulcanizing medium is supplied into its inside at vulcanization. Also, a sector mold member 53 is mounted on an inner circumference of each of the sector segments 52, and these mold members 53 mold a tread portion T of the green tire 18 at vulcanization.

On an outer circumference 52a of each of the sector segments 52, an inclined face (part of a conical face) with the same gradient as the inner circumference 50a of the outer ring 50 is formed, and these inner circumference 50a and the outer circumference 52a are connected with a dovetail joint and slidably engaged. As a result, when the outer ring 50 is elevated up and down with respect to the upper plate 48, the sector segment 52 and the sector mold member 53 are moved in the radial direction by a wedge action of the inner and the outer circumferences 50a and 52a in synchronization while being supported by the upper plate 48. The above mentioned sector segment 52 and the sector mold member 53 generally constitute a sector mold 54.

And when the rigid core 11 to which the green tire 18 is attached is loaded laterally on the lower mold 44 and the upper base 45 is lowered to the lower limit with the upper plate 48 brought into contact with the upper platen 46, all the sector molds 54 are pushed by the outer ring 50 and moved to the inner limit in the radial direction, whereby the adjacent sector molds 54 present a continuous ring shape in close contact. At this time, the vulcanizing mold 55 constituted by the lower mold 44 and the upper mold 49 and the sector mold 54 is closed so as to form a vulcanization space 56 in the toroidal shape for sealing and storing the green tire 18 between it and the rigid core 11.

After that, the green tire 18 is vulcanized while being surrounded by the lower mold 44, the upper mold 49, the sector mold 54 and the rigid core 11, when the high-temperature and high-pressure vulcanizing medium is supplied from a supply source, not shown, into the lower platen 43, the upper platen 46, the sector segment 52 and the vulcanizing medium chamber 15.

Next, the operation of the above mentioned first preferred embodiment will be explained.

First, while the rigid core 11 assembled in the annular state is rotated around the axis, the above-mentioned tire constituting members (unvulcanized rubber ribbon, wire, cord, etc.) are supplied and applied in sequence onto its outer surface so as to form the green tire 18 comprised of the inner liner 19, the carcass layer 22, the bead core 24, the belt layer 27, the side tread 28 and the top tread 29.

Then, the rigid core 11 with the green tire 18 formed outside is transported by the conveying device to the vulcanizing device 41. At this time, the rigid core 11 and the green tire 18 are heated to a normal temperature or a pre-heat temperature as mentioned above, but in any case, the temperature is relatively low, while the lower mold 44, the upper mold 49 and the sector mold 55 are at a high temperature close to the vulcanizing temperature since the vulcanizing device 41 has a large heat capacity. After that, the transported rigid core 11 and the green tire 18 are loaded laterally on the open lower mold 44. At that time, the upper surface of a projection portion 44a formed at the inner end in the radial direction of the lower mold 44 and projecting along the inner side face in the radial direction of the bead portion B of the green tire 18 is brought into contact with the outer face of the movable seal 34.

Next, in the state where a predetermined gap exists between the upper platen 46 and the upper plate 48, the upper base 45 and the upper plate 48 are integrally lowered. And when the sector segment 52 is brought into contact with the upper face of the lower base 42 and the upper mold 49 is brought into contact with the green tire 18, the lowering of the upper plate 48 is stopped. At this time, a projection portion 49a formed at the inner end in the radial direction of the upper mold 49 and projecting along the inner side face in the radial direction of the bead portion B of the green tire 18 slightly pushes the upper movable seal 34 into the annular recess 32 against the coil spring 36, while the projection portion 44a of the lower mold 44 also slightly pushes the lower movable seal 34 into the annular recess 32 against the coil spring 36.

At such closure of the vulcanizing mold 55, when the movable seal 34 is pushed against the coil spring 36 by the projection portions 44a and 49a of the lower mold 44 and the upper mold 49 as mentioned above, they are pressed into contact with each other so that the gap between the rigid core 11 and the lower mold 44 and the upper mold 49 can be eliminated easily and surely. As a result, at vulcanization which will be described later, unvulcanized rubber does not protrude from between the rigid core 11 and the lower mold 44 and the upper mold 49, and generation of burr can be prevented.

Here, the contact pressure between the movable seal 34 and the upper face of the lower mold 44 and the lower face of the upper mold 49 at the time when the movable seal 34 is pushed into the annular recess 32 by the lower mold 44 and the upper mold 49 is preferably within the range of 1 to 3 MPa adjusting an urging force of the coil spring 36 (spring constant). That is because if it is less than 1 MPa, the unvulcanized rubber might protrude from between the movable seal 34 and the lower mold 44 and the upper mold 49 at vulcanization which will be described later, while if it exceeds 3 MPa, the projection portions 44a and 49a of the lower mold 44 and the upper mold 49 might be deformed.

Even after the lowering of the upper plate 48 is stopped as mentioned above, when only the upper base 45 is still lowered, the piston rod 47 of the cylinder is retracted, and the upper base 45 gets close to the upper plate 48. If the upper base 45 gets close to the upper plate 48 in this way, the outer ring 50 moves the sector mold 54 inside in the radial diction in synchronization by wedge action of the inner circumference 50a and the outer circumference 52a.

When the upper base 45 is lowered to the lower limit, the sector mold 54 is moved to the inner limit in the radial direction so as to close the vulcanizing mold 55, and the green tire 18 is sealed and stored in the vulcanization space 56. Next, after a large clamping force is applied to the upper base 45, the high-temperature and high-pressure vulcanizing medium is supplied to the lower platen 43, the upper platen 46, the sector segment 52 and the vulcanizing medium chamber 15 so as to vulcanize the green tire 18.

The rigid core 11 which had been at a normal temperature or a pre-heat temperature at vulcanization is heated by the vulcanizing medium and has the temperature rise to the vulcanizing temperature and is thermally expanded. At that time, the lower mold 44 and the upper mold 49 only pushes (moves) the movable seal 34 further into the inside of the annular recess 32 against the coil spring 36, but the gripping force to the rigid core 11 hardly changes, whereby breakage of the rigid core 11 can be prevented. And this function is surely exerted even if there is a large difference in thermal expansion rate between the rigid core 11 and the vulcanizing mold 55.

When vulcanization of the green tire 18 is finished as mentioned above, the vulcanizing mold 55 is opened by the operation reverse to the above and then, the rigid core 11 to which the vulcanized tire is attached is transported to a work position by the transporting device. And at this work position, the core segment 12 is disassembled and taken out from inside the vulcanized tire sequentially.

Figure 5:
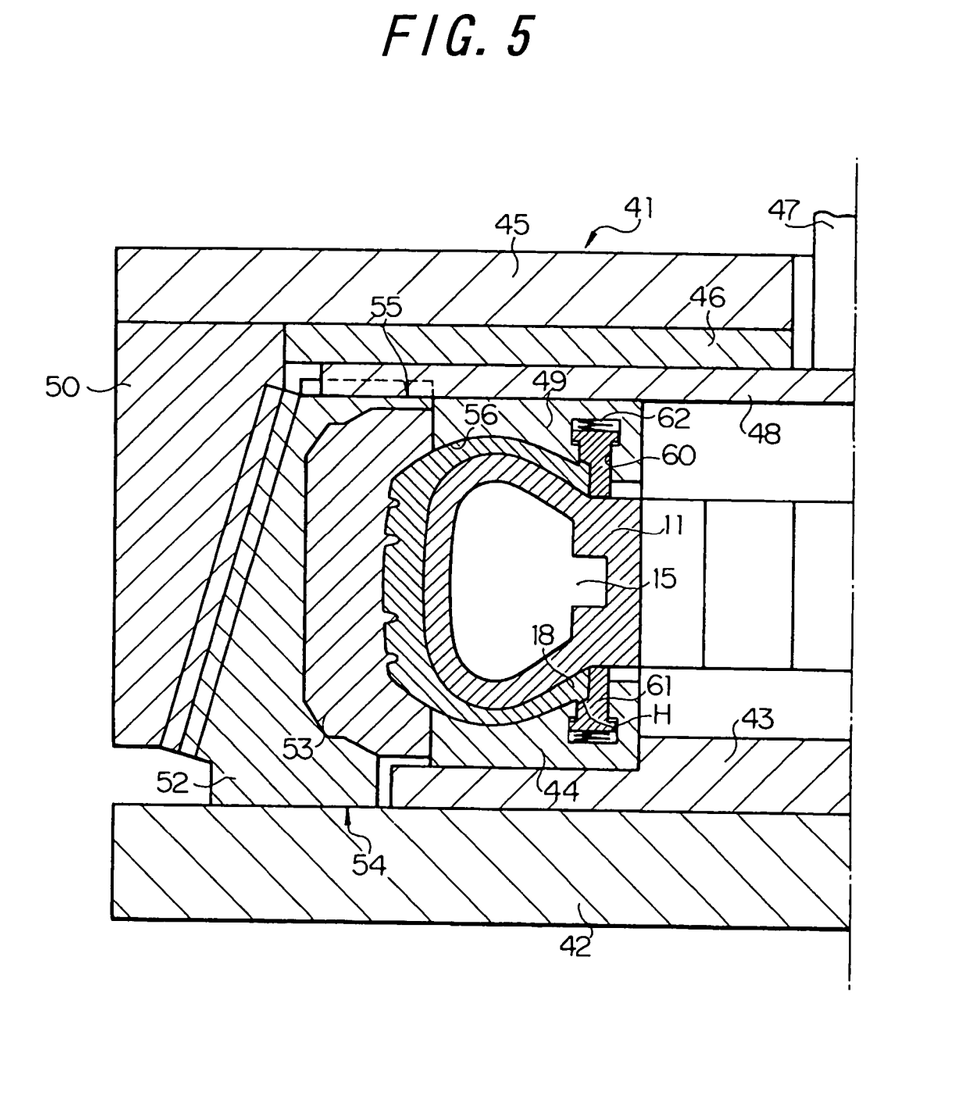
FIG. 5 is a front sectional view as with FIG. 3 showing a vulcanizing apparatus according to a second preferred embodiment of the present invention in the state where a green tire is stored together with a rigid core.
Figure 6:
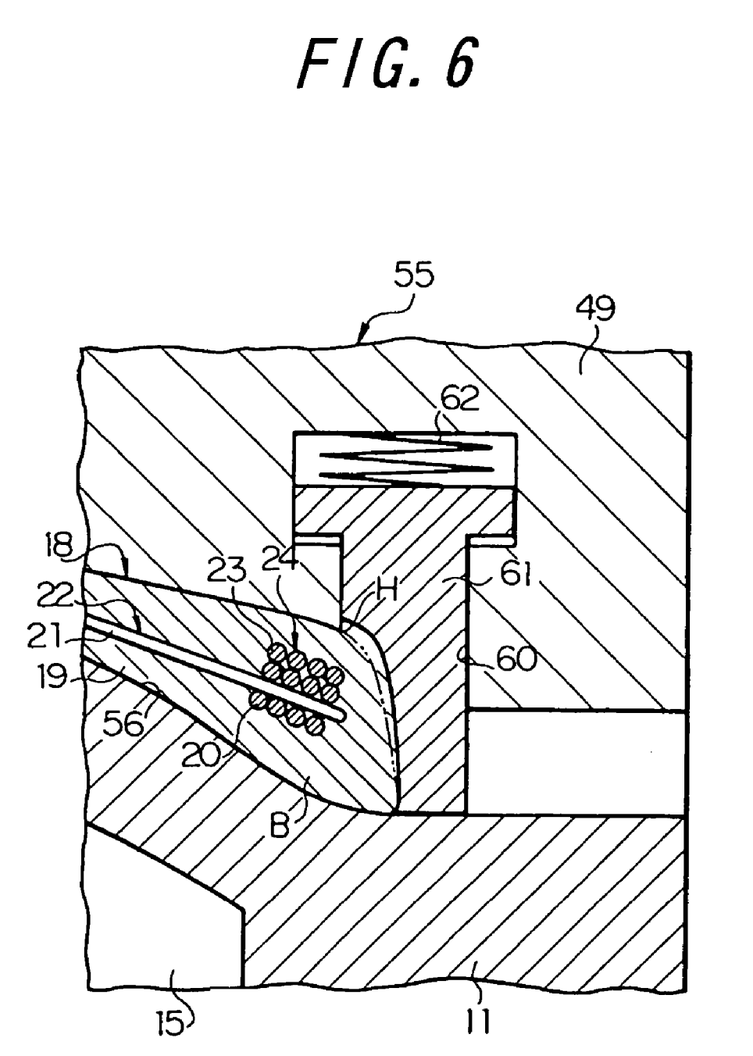
FIG. 6 is a front sectional view of the neighborhood of a bead portion at vulcanization.

FIGS. 5 and 6 show a second preferred embodiment of the present invention. In this preferred embodiment, an annular recess 60 with the cross section in the T-shape is formed so that it extends along a bead heel H on the upper face of the lower mold 44 and the lower face of the upper mold 49, respectively, in the neighborhood of both the bead heels H of the green tire 18. ON the other hand, an annular movable seal 61 with the cross section in the T-shape is movably inserted into each of the annular recesses 60 in the depth direction of the annular recess 60, and a coil spring 62 as an urging means for urging the movable seal 61 toward the rigid core 11 is stored in each of the annular recesses 60 between the movable seal 61 and the bottom face of the annular recess 60.

And at closure of the vulcanizing mold 55 when the upper mold 49 is brought close to the lower mold 44, both the movable seals 61 are slightly pushed in by the rigid core 11 against the coil spring 62 so that a gap between the rigid core 11 and the lower mold 44 and the upper mold 49 is eliminated so as to prevent protrusion of unvulcanized rubber from between the rigid core 11 and the lower mold 44 and the upper mold 49 at vulcanization, and to absorb thermal expansion of the rigid core 11 at vulcanization by the movable seal 61 by further pushing in the movable seal 61 against the coil spring 62 so as to prevent breakage of the rigid core 11.

Also, in the second preferred embodiment, before closure of the vulcanizing mold 55, the outer face at the outer end in the radial direction of the movable seal 61 is located flush on the extension of the upper face and the lower face of the lower mold 44 and the upper mold 49 adjacent to this outer face, but the outer face at the inner end in the radial direction protrudes from the upper face and the lower face of the lower mold 44 and the upper mold 49 adjacent to this outer face in order to exert the same function as the projection portions 44a and 49a. The other constitutions and action are the same as those of the first preferred embodiment.

As described above, according to the present invention, such a state can be prevented that the unvulcanized rubber protrudes from between the rigid core and the vulcanizing mold at vulcanization to generate burr or that the rigid core is subjected to an excessive gripping force from the vulcanizing mold to be broken.

The present invention has been described with reference to the illustrated preferred embodiments, though various changes may be made in implementing the present invention.

For example, in each of the above preferred embodiments, the vulcanizing mold 55 is constituted by the lower mold 44, the upper mold 49 and the sector mold 54, but the present invention may be applied to a vulcanizing mold made only of a lower mold and an upper mold. In this case, a lower half of a tread portion of a green tire is molded by a lower mold, while an upper half by an upper mold.

Also, in each of the above preferred embodiments, the outer face of the movable seal 34 before vulcanization is made flush with the upper face and the lower face of the rigid core 11, but in the present invention, the outer face of the movable seal may protrude in advance from the upper face and the lower face of the rigid core by the total amount of being pushed-in of the movable seal. In this case, the outer face of the movable seal is flush with the upper face and the lower face of the rigid core when vulcanization is finished.

The invention claimed is:

1. A method for manufacturing a pneumatic tire in which a green tire is formed on an outer face of a rigid core, the green tire is transported into a vulcanizing mold together with the rigid core, and the vulcanizing mold is closed to form a vulcanization space for sealing and storing the green tire between the vulcanizing mold and the rigid core so that the green tire is vulcanized in the vulcanization space, characterized by that an annular movable seal for preventing unvulcanized rubber from flowing past the seal, supported by either one of the vulcanizing mold and the rigid core, is urged toward the surface of the other so as to prevent generation of a gap between the vulcanizing mold and the rigid core when the vulcanizing mold is closed and to absorb change in the shape of the rigid core at vulcanization, wherein the one of the vulcanizing mold and the rigid core that supports the annular movable seal has an annular recess for storing the annular movable seal, and means for urging the one of the vulcanizing mold and the rigid core toward the surface of the other is arranged in the annular recess, the annular movable seal includes a narrow width portion located on a face side, a wide width portion located on an inner side, and a stepped surface at a boundary between the narrow width portion and the wide width portion, the annular recess includes a stepped surface that can be brought into contact with the stepped surface of the annular movable seal, and the stepped surface of the annular recess and the stepped surface of the annular movable seal are arranged so that when they are in contact with each other, an outer surface of the movable seal is flush with a surface of said one of the vulcanizing mold and the rigid core adjacent the annular recess.

2. An apparatus for manufacturing a pneumatic tire, the apparatus comprising:

a rigid core for forming a green tire on an outer face, and a vulcanizing mold that can transport the green tire together with the rigid core, wherein the vulcanizing mold is closed to form a vulcanization space for sealing and storing the green tire between the vulcanizing mold and the rigid core so that the green tire is vulcanized in the vulcanization space;

an annular movable seal for preventing unvulcanized rubber from flowing past the annular movable seal, supported by either one of the vulcanizing mold or the rigid core; and an urging means for urging the annular movable seal from the one of the vulcanizing mold and the rigid core that supports the annular movable seal toward a surface of the other of the vulcanizing mold and the rigid core, the annular movable seal being urged by the urging means toward the surface of the other of the vulcanizing mold and the rigid core, so as to prevent generation of a gap between the vulcanizing mold and the rigid core when the vulcanizing mold is closed, and to absorb a change in shape of the rigid core upon vulcanization of the green tire, wherein the one of the vulcanizing mold and the rigid core that supports the annular movable seal has an annular recess for storing the annular movable seal, and the urging means is arranged in the annular recess, the annular movable seal includes a narrow width portion located on a face side, a wide width portion located on an inner side, and a stepped surface at a boundary between the narrow width portion and the wide width portion, the annular recess includes a stepped surface that can be brought into contact with the stepped surface of the annular movable seal, and the stepped surface of the annular recess and the stepped surface of the annular movable seal are arranged so that when they are in contact with each other, an outer surface of the movable seal is flush with a surface of said one of the vulcanizing mold and the rigid core adjacent the annular recess.

3. An apparatus according to claim 2, wherein the annular recess is provided on the rigid core, and an outer surface of the movable seal before closure of the vulcanizing mold is approximately aligned with a surface of the rigid core adjacent on both sides of the annular recess.

4. An apparatus according to claim 3, wherein an inner face of the vulcanizing mold to which the outer surface of the movable seal makes an elastic contact is formed as a projection portion with a width narrower than the annular recess.

5. An apparatus according to claim 2, wherein the urging means is a compression spring made of metal.

6. An apparatus according to claim 2, wherein the urging means brings the movable seal into elastic contact with said other surface of the vulcanizing mold and the rigid core with a contact pressure of 1 to 3 MPa.

7. An apparatus according to claim 2, wherein the movable seal is supported by the rigid core at a position adjacent to a bead tip end position of the green tire.

8. An apparatus according to claim 2, wherein the movable seal is supported by the vulcanizing mold at a position adjacent to a bead bottom position of the green tire.

* * * * *

UNITED STATES PATENT AND TRADEMARK OFFICE
CERTIFICATE OF CORRECTION

PATENT NO. : 7,648,668 B2
APPLICATION NO. : 10/513000
DATED : January 19, 2010
INVENTOR(S) : Takehiro Kata It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1028 days.

Signed and Sealed this

Twenty-third Day of November, 2010

David J. Kappos
*Director of the United States Patent and Trademark Office*